April 29, 1941.      R. GOLICKE ET AL      2,239,781
HIGH FREQUENCY MEASURING RESISTOR
Filed July 9, 1938      2 Sheets-Sheet 1
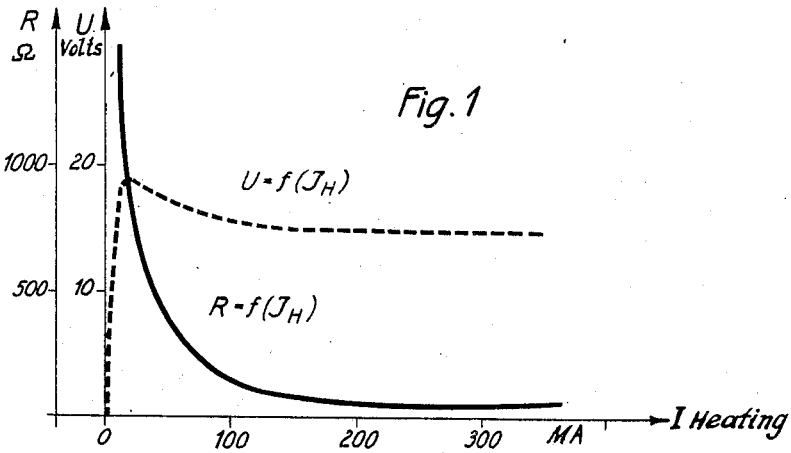
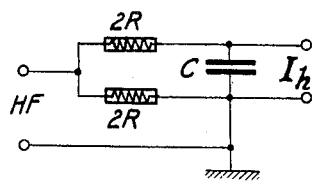
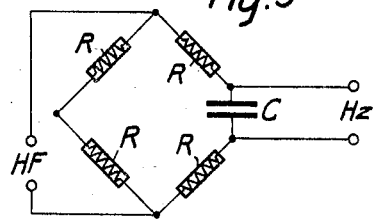
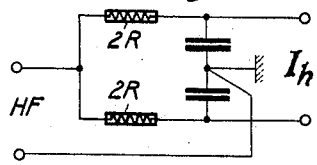
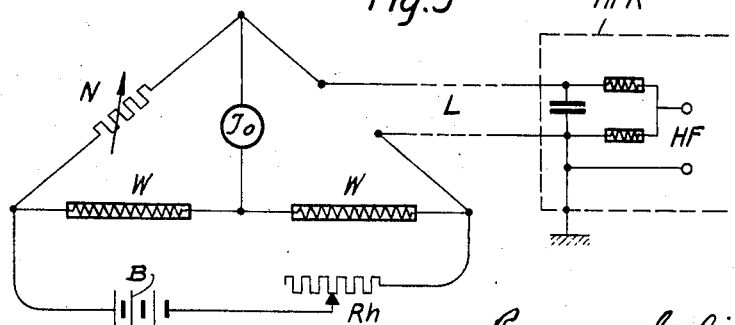
Roman Golicke
Andreas Jaumann
Inventors
by Knight
attys.

April 29, 1941.　　R. GOLICKE ET AL　　2,239,781
HIGH FREQUENCY MEASURING RESISTOR
Filed July 9, 1938　　2 Sheets-Sheet 2

Patented Apr. 29, 1941

2,239,781

UNITED STATES PATENT OFFICE 2,239,781

HIGH FREQUENCY MEASURING RESISTOR

Roman Golicke, Falkenhain, near Falkensee, and Andreas Jaumann, Berlin-Charlottenburg, Germany, assignors to Siemens & Halske, Aktiengesellschaft, Siemensstadt, near Berlin, Germany, a corporation of Germany Application July 9, 1938, Serial No. 218,463
In Germany July 15, 1937

15 Claims. (Cl. 175—368)

The present invention relates to high-frequency resistance means in particular for measuring purposes.

As is well known the usual step resistors arranged in decimal connection present the drawback when taking measurements at high frequency that their self-capacity leads to false test readings and must be eliminated by complicated computation and approximation methods. Owing to their construction it is not possible to remove the self-capacity in such resistors and the problem of designing a high-frequency measuring resistor for frequencies up to 20 megacycles having a very small capacity could not hitherto be solved. The value which the switching capacity of a high-frequency measuring resistor should have if the faults as to phase and magnitude should not exceed a tolerance of ±1% will hereinafter be explained by reference to an example. For the most favorable selection of the range of resistance in the case of a decadic regulation of 50 to 500Ω, the switching inductivity amounts to $$L \leq \frac{0.5}{\omega} \text{ henry}$$

and the switching capacity $$C \leq \frac{2 \cdot 10^{-5}}{\omega} \text{ farad}$$

or for
$f=20$ megacycles and
$\omega = 1.25 \times 10^8$ we obtain
$L \leq 4$ nh., whereby 1 nh. (nanohenry) $=10^{-9}$ henry
$C \leq 0.16$ pf., whereby 1 pf. (piccofarad) $=10^{-12}$ farad The measuring resistors now employed have, however, a switching inductivity of $L$ 200 nh. and a switching capacity of $C$ 4 pf. As will be apparent from the above, these values are by a multiple order of magnitude greater than would be convenient, and it is also not possible to reduce these values to a considerable extent even in the case of a compact construction and of special measures.

According to the invention it is proposed to employ as a measuring resistor, particularly for high-frequency measuring purposes, a material whose specific conductance may be continuously varied within wide limits with the aid of a suitable control magnitude. In this manner all switching devices are avoided, thus effecting a considerable saving in space and wiring materials.

In modern electrical engineering numerous materials or elements are known whose specific conductance may be easily varied within extremely wide limits. In the present case it is particularly advantageous to employ so-called thermonegative resistors, since the specific conductance thereof increases considerably with increasing temperature. Thermonegative resistors of a special type are made of pressed or burnt metal oxides, particularly of uranium dioxide. The specific conductance of such a resistor may therefore be varied by changing its temperature which in turn is controlled by an electrical control magnitude. In principle, other heating conductors such as carbon resistors and the like or thermopositive resistors such as iron hydrogen resistors having a high coefficient of temperature, may also be employed.

Our invention is illustrated in the accompanying drawings, in which—

Fig. 1 represents a calibrating curve for a resistor of the thermonegative type, and in which the voltage and the resistance are plotted against the heating current supplied.

Figs. 2 to 4 represent circuit diagrams for simultaneously carrying out high and low frequency measurements.

Figure 6:
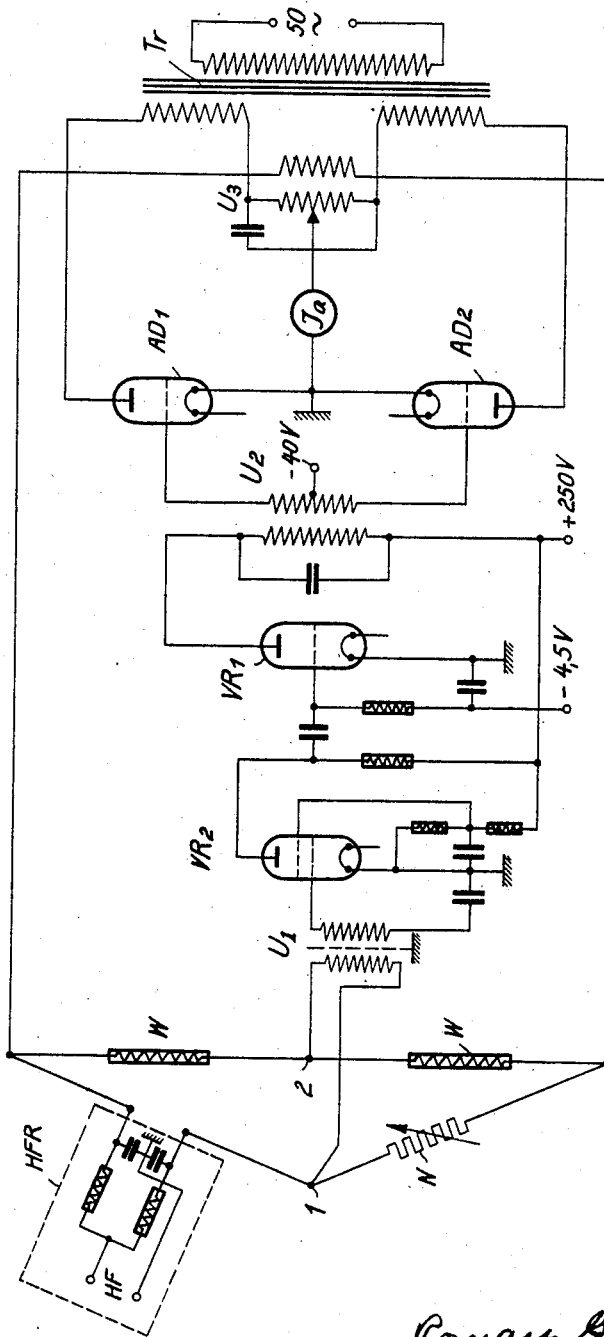

Fig. 5 represents a measuring circuit in which the entire high frequency measuring resistor system is located in one branch of a low frequency auxiliary measuring bridge, and Fig. 6 represents a further improvement over the circuit Fig. 5, in which the heating energy for the high frequency resistor is derived from the output of an amplifying system, whose input is connected to the auxiliary bridge.

Before indicating a method for measuring high frequencies by the use of a measuring resistor according to the invention the properties, for instance, of an uranium dioxide resistor will first be explained by reference to the accompanying drawings. In Fig. 1 are indicated by the current-voltage characteristic U (dash curve) and the resistance characteristic R (heavy line curve) of such a resistor in dependence on the heating current $Ih$. The diagram shows that the resistance may be varied between 20 and 1500Ω in steps so that, for instance, a decadic control may be easily effected between 50 and 500Ω. However, from the resistance curve it will also be apparent that the regulation may be effected in much finer steps. Experimental measurements have already been taken in which the resistance was regulated in thousandth steps.

The adjustment of such a resistor by reference to a calibration curve determined by measuring the heating current such as is shown, for instance, in Fig. 1, is not suitable for accurate measurements, since the temperature is also dependent upon the room temperature, etc. Consequently, a desired resistance value must be first checked or an adjusted resistance value must be checked afterwards with direct current or low frequency or still better as is proposed according to the invention the high-frequency and low-frequency measurements are carried out simultaneously. In this case the faults are eliminated which enter when the measurements are made at different times, during which the resistance may for instance have cooled. To this end, it is necessary to separate the high-frequency circuit from the heating or the testing circuit as will now be explained with reference to the arrangements of Figs. 2 to 4.

According to Fig. 2 two approximately equal resistors 2R, each having the ohmic resistance 2R, are parallel connected for the high-frequency so as to result in a resistance of the value R, whereas for the heating circuit Ih they are series-connected so as to result in a resistance of the value 4R. A condenser C is connected across the resistors 2R and completes the high-frequency circuit so that both circuits have substantially only the ohmic resistance of the resistors 2R in common but are otherwise separated. The heating current has a low frequency and may be supplied from a utility network with alternating current of customary frequency, or from a DC source. The condenser C has a high impedance for such low frequency (or DC) currents and thus does not interfere with the operation of the heating circuit nor form an operative part thereof. In this case tolerances for the values of both resistors of ±10% are admissible, for the series-connection then still gives the fourfold value of the parallel connection exactly within ±¼%. In Fig. 3 is shown another embodiment which in principle is similar to that shown in Fig. 2 except that here four individual resistors each having a resistance R are employed. The high-frequency circuit is also here separated from not-illustrated part of the heating circuit Ih by a capacitor C. The two embodiments above-described have the drawback that the two branches containing the resistors are not symmetrical with respect to the high-frequency measuring circuit. A symmetrical arrangement of the high-frequency resistors is shown in Fig. 4 in which two resistors, each of the resistance value 2R, lie in two branches which are connected to earth through two capacitors each of the magnitude 2C.

The simplest complete circuit connection suitable for a measuring resistor according to the invention is shown in Fig. 5. Here the entire high-frequency measuring resistor system designated by HFR, and which is connected at the terminals HF to the high frequency system to be investigated (not shown here), lies in one of the branches of a low-frequency auxiliary measuring bridge and in order to establish the desired resistance value the resistance standard N is adjusted to this value and the heating current is regulated by a rheostat Rh until a bridge balance is brought about. Conversely, in balancing a high-frequency bridge the heating is at first regulated and then the resistance standard is so adjusted that the auxiliary bridge is balanced. The heating current derived from source B serves at the same time as measuring current for the auxiliary bridge.

According to the invention the separate adjustment of the regulating resistor Rh and of the standard resistor N in Fig. 5 may be avoided and the operation may be simplified particularly by deriving the heating energy from the output side of an amplifying arrangement whose input side is connected to and controlled by the auxiliary bridge; i. e., the voltage existing across the neutral or zero branch of the auxiliary bridge circuit is employed for controlling the increase or decrease of heating. In this manner the measuring resistor depending upon the regulating slope or sensitivity of the arrangement adjusts itself automatically within ±0.1% or within an even smaller fraction of the standard resistance.

Such a connection is shown in Fig. 6. The high-frequency measuring resistor system HFR, to the terminals HF of which the high frequency system to be investigated is connected as in Fig. 5, lies as above described also in one of the branches of the auxiliary bridge circuit, while the input circuit of an amplifying arrangement, consisting of a plurality of amplifier tubes VR1, VR2, AD1 and AD2 and of the corresponding transformers U1, U2, U3 and the conventional capacitors and resistors cooperating therewith, is connected to the zero branch 1—2 of the bridge. In this case it is preferable to feed the auxiliary bridge circuit with alternating current, particularly with alternating current from the utility network. To the output side of the last amplifying stage AD1, AD2, which receives its anode energy from the alternating current source by way of transformer Tr, is connected the transformer U3, the secondary winding of which supplies the heating and operating current for the measuring bridge, this current being composed of a voltage component taken from the supply network and a voltage component taken from the anodes of the AD1 and AD2 tubes. Consequently, a modulation of these two voltages occurs which may be added or subtracted at the zero branch of the auxiliary bridge depending upon the position of the phase, thus effecting automatically upon a change of the standard resistance N in either direction the raising or lowering of the high-frequency resistor temperature and therefore a readjustment of the high-frequency resistor to the value of the resistance standard. The tubes AD1 and AD2 therefore act in this connection as a controlled regulating resistor, similar to Rh in Fig. 5, located between the energy supply source and the current consuming device (bridge). In the case of an accurate bridge balance these tubes are therefore not loaded or only to a slight extent and only an average heating energy is supplied to the auxiliary bridge circuit or the high-frequency measuring resistance. If, however, the bridge circuit is detuned the output of the tubes is varied, and it depends upon the phase displacement between the control voltage and the supply voltage whether in this case the resistance of the tubes increases or decreases. For instance, if the control voltage is in phase with the anode voltage (voltage of supply network) the resistance decreases and the heating of the measuring resistor increases and vice versa.

Since the phase of the voltage in the bridge branch reverses depending upon whether the measuring HFR resistance is greater or smaller than the standard resistance N, the heating may be increased by suitably changing the polarity of the transformer U3 if the measuring resistance is too great or the heating may be decreased if the measuring resistance is too small.

If, for instance, the amplification is chosen so high that already a detuning of ±0.1% varies the heating from 0 to the maximum value and if this maximum value amounts to a multiple of the fixed maximum value, it is possible to make the measuring resistance HFR automatically equal to the standard resistance N within ±0.1%. This may under certain circumstances take several seconds to attain owing to the heat sluggishness of the positive resistor, but on the other hand this sluggishness avoids hunting of the regulating actions of the amplifying system. To reduce the great heat sluggishness of the known resistor material it is preferable to use resistor shapes which have an increased surface as compared with their volume, such as tubular resistors instead of rod resistors. The loading of the amplifying system, for instance, the voltage applied to the grids of the end tubes AD1 and AD2 is a measure for the degree of the bridge balance prevailing at that moment. After changing the standard resistance it is therefore advisable to wait until the filament power of the amplifiers, after temporarily assuming a very high or low value, has returned again to an average value. In order that this may easily be controlled a direct-current instrument Ja is inserted in the anode circuit, which instrument then indicates the filament power, since the anode curent is proportional to the latter. In this way an agreement between the measuring and the standard resistance within at least ±0.1% is ensured. Owing to the above-mentioned heat sluggishness of the positive resistor its cooling down depends upon its time constant. The fine balancing of the bridge is nevertheless effected in a relatively short time, since the filament power is already cut off when detuning the bridge within 0.1%. However, the heating up of the resistor may be accelerated at will by the use of a greater filament power.

If in the case of high-frequency measurements a large number of measurements must be carried out with a constant resistance value it may be under certain circumstances preferable to bring the resistor in a thermostat controlled chamber to the temperature corresponding to the desired resistance value and to maintain the chamber temperature constant by the thermostat. However, this arrangement requires a greater cost.

The high-frequency resistor is preferably so designed that the high-frequency part proper, see Figs. 5 and 6, is separated from the control circuit or if desired it may be combined with the high-frequency measuring bridge to an instrument. This feature forms no part of the present invention and is therefore not illustrated. The high-frequency measuring instrument is then connected to the amplifying regulating arrangement by a flexible conductor. It is also preferable to mount the material for the resistor so that its circuit connections and terminals have the smallest possible capacity. Also this is a feature which per se is not involved in the present invention and pertains rather to expedients conventional in the mounting and connections of elements forming part of a high frequency circuit. Its detail illustration has therefore also been omitted.

While we have shown and described a particular mode of heating the high frequency resistors, it is obvious that the heating per se may be accomplished by other equivalent means within the scope of the invention so long as the heating is controlled according to the idea described and claimed.

What is claimed is:

1. In combination with a high-frequency circuit, ohmic measuring resistance means connected in said circuit for high-frequency measurements and consisting of a material having a temperature-responsive electric resistance varying with temperature over a wide range, a measuring bridge circuit including said resistance means in one of its branches, circuit means forming part of said high-frequency circuit for separating said high-frequency circuit from the other branches of said bridge circuit so that said two circuits have substantially only said ohmic resistance means in common, a standard resistance connected in one of said other of said bridge circuit branches, and a current source included in said auxiliary bridge for heating said resistance means to a temperature necessary to produce a resistance value determined by said standard resistance when the bridge circuit is balanced.

2. In combination with a high-frequency circuit in combination, a variable resistance device comprising a plurality of ohmic resistance elements connected in parallel in said high-frequency measuring circuit and consisting of a material having a temperature-responsive specific resistance such that their resistance value varies continuously with their temperature over a wide range, and a heating circuit connected with said resistance elements so as to include said elements in series connection and containing controllable means for supplying said resistance elements with variable heating current for varying their temperature to enable their adjustment to a desired resistance value, and circuit means forming part of said high-frequency circuit and completing said latter circuit independent of said controllable current supply means.

3. In combination with a high-frequency measuring circuit in combination, a measuring resistance arrangement comprising a plurality of ohmic resistance elements connected in parallel in said high-frequency measuring circuit and being composed of a material having a temperature-responsive specific resistance such that their resistance value varies continuously with their temperature over a wide range, a measuring bridge circuit including said resistance elements in series in one of its branches, a standard resistor arranged in another branch of said bridge, current supply means included in said bridge circuit for heating said resistance elements to a temperature necessary to adjust their resistance to a value determined by said standard resistor when said bridge circuit is balanced, and circuit means forming part of said high-frequency circuit and completing said circuit separately from said standard resistor and said current supply means.

4. In combination with a high-frequency measuring circuit in combination, a measuring resistance arrangement consisting of a plurality of resistance elements connected in parallel in a high-frequency measuring circuit and being composed of a material having a temperature-responsive resistance such that their resistance value varies continuously with temperature over a wide range, a plurality of condensers forming part of said high-frequency circuit, each of said condensers being connected to one end of said resistance elements respectively and having a common ground connection together with the other condensers symmetrical with respect to said elements, and a heating circuit connected to the ends of said elements to which said condensers are connected and including all of said elements in series for varying their temperature to enable their adjustment to a desired resistance value during the high-frequency measurement.

5. In combination a measuring resistance for high-frequency measuring circuits, consisting of a plurality of resistance elements connected in parallel in a high-frequency measuring circuit and being composed of a material having a temperature-responsive resistance such that their resistance value varies continuously with temperature over a wide range, a plurality of condensers forming part of said high-frequency circuit, each of said condensers being connected to one end of said resistance elements respectively and having a common ground connection together with the other condensers symmetrical to said elements, a measuring bridge circuit including all of said resistance elements in series in one of its branches, a standard resistor arranged in another branch of said bridge circuit, and current supply means also included in said bridge circuit for heating said resistance elements to a temperature necessary to adjust their resistance to a value determined by said standard resistance when said bridge circuit is balanced.

6. In combination a measuring resistance for high-frequency measuring circuits, consisting of a plurality of resistance elements connected in parallel in a high-frequency measuring circuit and being composed of a material having a temperature-responsive resistance such that their resistance value varies continuously with temperature over a wide range, a plurality of condensers forming part of said high-frequency circuit, each of said condensers being connected to one end of said resistance elements respectively and having a common ground connection together with the other condensers symmetrical to said elements, a measuring bridge circuit including all of said resistance elements in series in one of its branches, a standard resistor in another branch of said bridge circuit, current supply means also included in said bridge circuit for heating said resistance elements to a temperature necessary to adjust their resistance to a value determined by said standard resistance when said bridge circuit is balanced, and means for controlling the heating current in accordance with the potential in the neutral bridge branch of said bridge circuit so that the smallest mean potential prevails in said neutral bridge branch.

7. In combination a measuring resistance for high-frequency measuring circuits, consisting of a plurality of resistance elements connected in parallel in a high-frequency measuring circuit and being composed of a material having a temperature-responsive resistance such that their resistance value varies continuously with temperature over a wide range, a plurality of condensers forming part of said high-frequency circuit, each of said condensers being connected to one end of said resistance elements respectively and having a common ground connection together with the other condensers symmetrical to said elements, a bridge circuit including all of said resistance elements in series in one of its branches, a standard resistor in another branch of said bridge circuit, AC supply means for providing heating energy for said resistance elements and operating energy for said bridge circuit, an amplifier system having its input circuit connected with the neutral bridge branch of said bridge circuit, a second amplifier system having its input circuit connected to the output side of said first amplifier system and having its own output side electrically coupled with said AC supply means and with the supply terminals of said bridge to produce two different synchronous supply potentials, one modulating the other, so that the heating energy supplied to said bridge terminals is controlled by a resultant voltage depending upon the phase positions of the voltage across said neutral bridge branch and the voltage of said supply means.

8. In combination a measuring resistance for high-frequency measuring circuits, consisting of a plurality of resistance elements connected in parallel in a high-frequency measuring circuit and being composed of a material having a temperature-responsive resistance such that their resistance value varies continuously with temperature over a wide range, a plurality of condensers forming part of said high-frequency circuit, each of said condensers being connected to one end of said resistance elements respectively and having a common ground connection together with the other condensers symmetrical to said elements, a measuring bridge circuit including all of said resistance elements in series in one of its branches, a standard resistance in another branch of said bridge circuit, AC supply means for providing heating energy for said resistance elements and operating energy for said bridge circuit, an amplifier system having its input circuit connected with the neutral bridge branch of said bridge circuit, a second amplifier system having its input circuit connected to the output side of said first amplifier system and having its own output side associated with said AC supply means, a transformer connected into said amplifier output side and having its secondary winding connected with the supply terminals of said bridge circuit to produce two different synchronous supply potentials, one modulating the other, so that the heating energy supplied to said bridge terminals is controlled by a resultant voltage depending upon the phase positions of the voltage across said neutral bridge branch and the voltage of said supply means, and means for varying the polarity of said transformer so as to increase the heating when the resistance of said elements is too large and to decrease the heating when said resistance is too small, depending upon the character of the resistance material employed.

9. In combination with a high-frequency circuit, an ohmic measuring resistance unit for high-frequency measurements consisting of a material having a substantially purely ohmic resistance varying continuously with temperature over a wide range, said resistance having a large surface as compared with its volume so as to have a minimum thermal inertia, and adjustable circuit means electrically connected with said resistance so as to form a heating circuit for controlling the temperature of said resistance unit to adjust it to a desired resistance value during the high-frequency measurement, said high-frequency circuit being completely independent of said adjustable circuit means so as to have practically only said ohmic resistance unit in common with said heating circuit.

10. In combination with a high-frequency circuit to be adjusted, a controlling circuit including means for supplying auxiliary current of lower frequency, ohmic resistance means arranged in said two circuits to be simultaneously operative therein and forming the only common part of both, said resistance means comprising a variable resistor of a material having a temperature-responsive resistance varying with its temperature over a resistance range of several orders of magnitude, said controlling circuit containing an adjustable standard resistor and having a circuit branch voltage dependent upon the resistance values of said two resistors, and circuit means operatively connected between said circuit branch and said current supply means for controlling said auxiliary current in dependence upon the voltage of said circuit branch so as to heat said variable resistor to adjust it to a desired resistance value in accordance with the adjustment of said standard resistor.

11. In combination with a high-frequency circuit, variable resistance means consisting of material having a specific resistance varying in dependence upon temperature over a resistance range of several orders of magnitude, a controlling circuit associated with said resistance means and having current supply means for heating said resistance means, said controlling circuit containing an adjustable standard resistor and having a circuit branch dependent as to voltage upon the resistance of both said resistor and said resistance means, and circuit means operatively connected between said circuit branch and said current supply means for controlling the heating of said resistance means in dependence upon the voltage of said circuit branch to adjust said resistance means to a desired resistance value in accordance with the adjustment of said standard resistor.

12. In combination with a high-frequency circuit, two thermonegative resistors parallel-connected in said circuit, a heating circuit connected with said resistors so as to contain them in series-arrangement, control means in said heating circuit for varying the heating current supplied to said resistors to adjust their resistance to a desired value, said high-frequency circuit including shunt means of high impedance to said heating current in order to separate said high-frequency circuit from said control means.

13. In combination, a high-frequency circuit, an auxiliary circuit of lower frequency, resistance means virtually of purely ohmic character connected in said two circuits so as to be simultaneously operative in both circuits and forming the only common link thereof, said resistance means comprising a resistor consisting of a material having a temperature-responsive electric resistance such that its specific resistance value varies continuously with temperature over a wide range, variable control means associated with said resistor for controlling the temperature of said resistor to selectively adjust same to a predetermined resistance value effective in said high-frequency circuit.

14. In combination, a high-frequency circuit, an ohmic resistance device connected in said high-frequency circuit and consisting of material having a temperature-responsive specific resistance which varies continuously over a wide range with correspondingly varying temperature, an auxiliary circuit for a lower frequency connected with said resistor so that said resistor forms a common element of said two circuits, a variable control resistance arranged in said auxiliary circuit for varying the low-frequency current flowing through said ohmic resistance device in order to adjust its resistance to a desired value, variable impedance means also arranged in said auxiliary circuit for setting said desired resistance value, and indicating means also connected in said auxiliary circuit for comparing the setting of said impedance with the resistance of said resistance means as adjusted by said control resistance.

15. In combination with a high-frequency circuit ohmic resistance means connected in said circuit for high-frequency measurements and consisting of a material having a thermonegative resistance varying continuously with temperature over a wide range, a measuring circuit connected with said high-frequency circuit so as to have said ohmic resistance means in common therewith, current-supply means connected with said measuring circuit for energizing it with current of lower frequency, control means associated with said resistance means for varying the temperature of said resistance means to adjust it to a desired resistance value, and measuring means in said measuring circuit for indicating the resistance value of said resistance means.

ROMAN GOLICKE.
ANDREAS JAUMANN.